July 28, 1964   J. E. COOK   3,142,553
GOB CHUTE ACTUATING MECHANISM
Filed Sept. 6, 1960   2 Sheets-Sheet 1
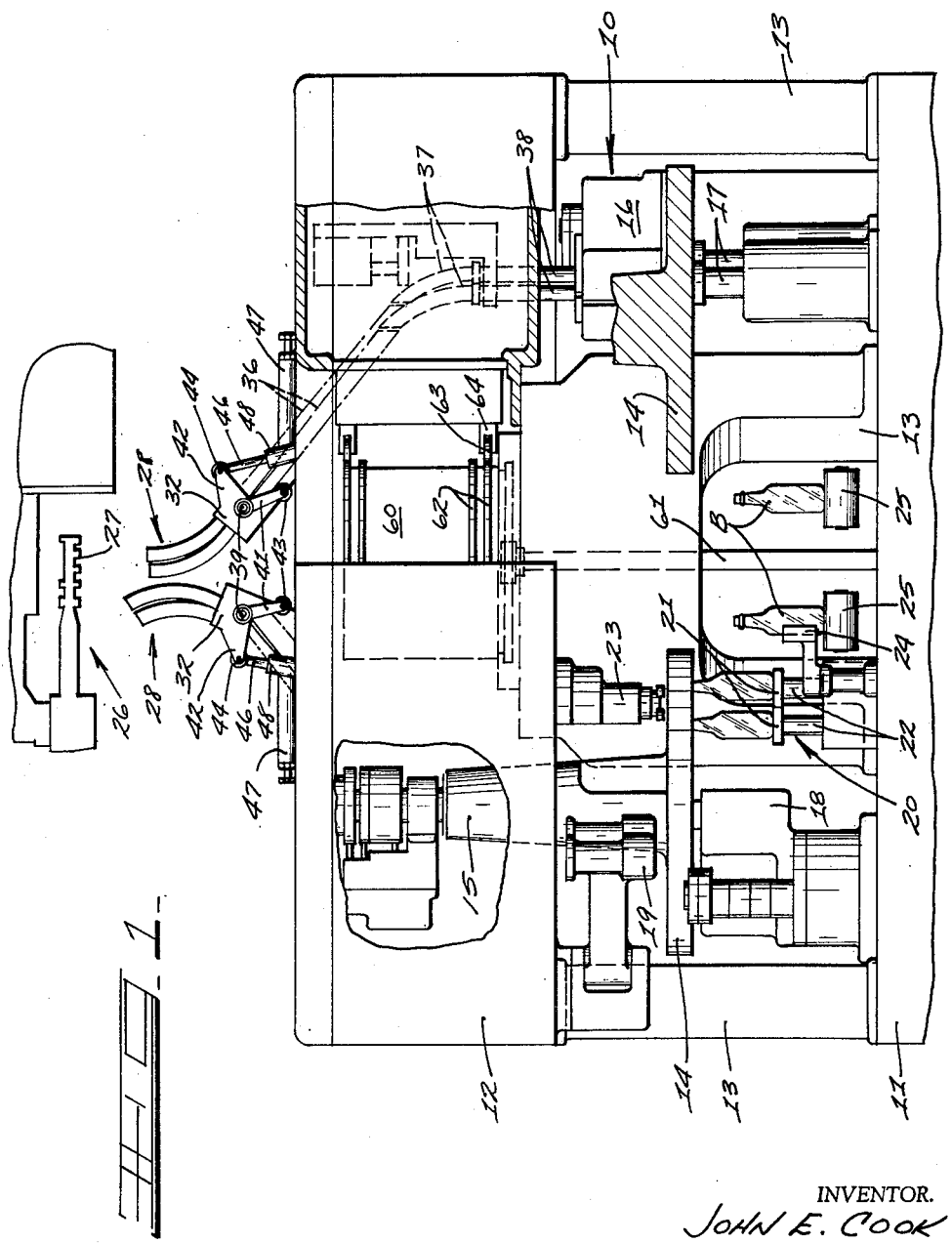
INVENTOR.
JOHN E. COOK
BY D. T. INNIS &
J. R. NELSON
ATTORNEYS

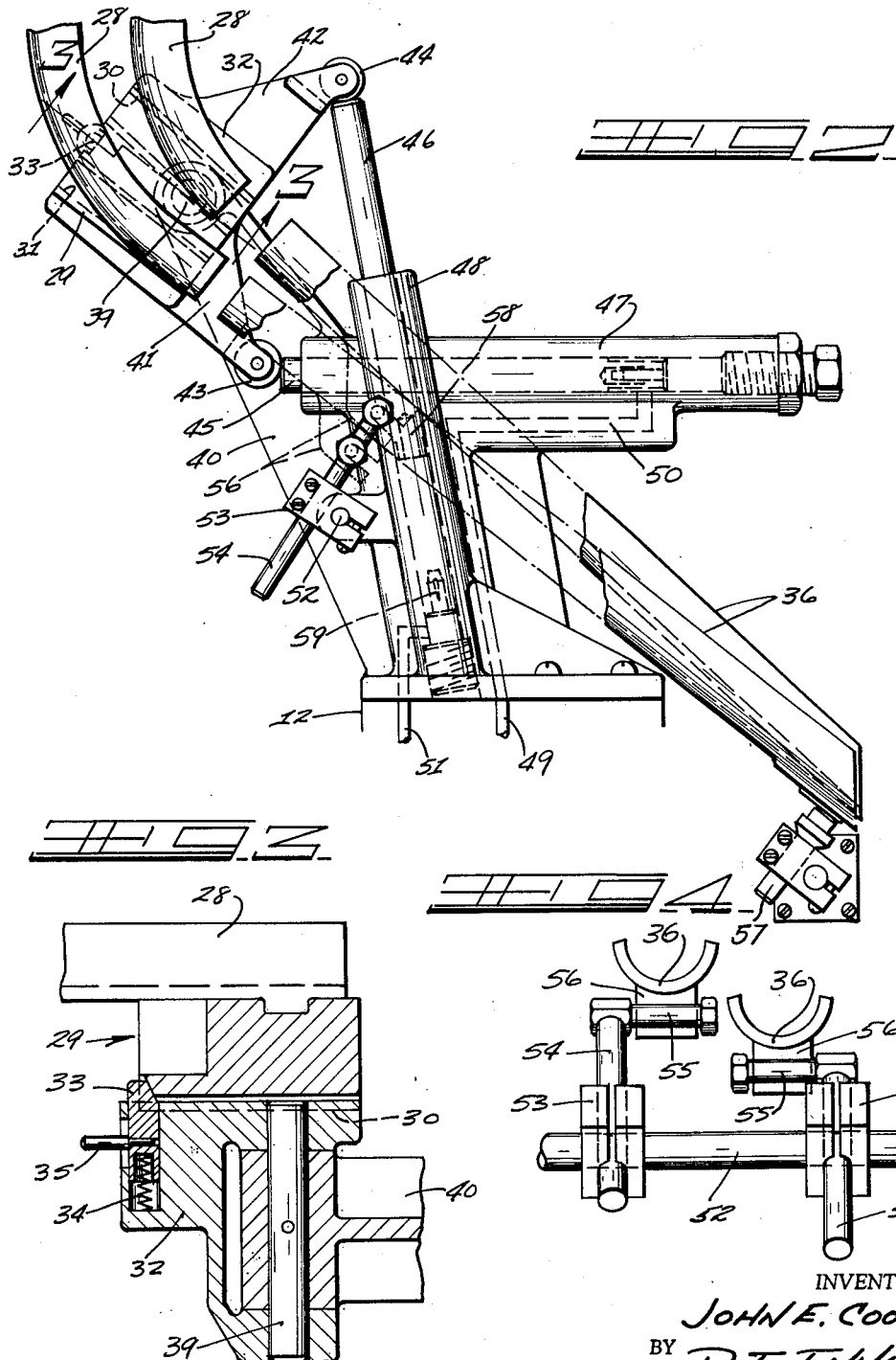

United States Patent Office 3,142,553
Patented July 28, 1964

3,142,553
GOB CHUTE ACTUATING MECHANISM
John E. Cook, Toledo, Ohio, assignor to Owens-Illinois
Glass Company, a corporation of Ohio
Filed Sept. 6, 1960, Ser. No. 54,041
2 Claims. (Cl. 65—304)

This invention relates to the manufacture of molded articles made of glass or other thermoplastic materials. The invention is particularly adapted for use in the manufacture of molded glass articles by methods in which mold charges or gobs of molten glass are dropped by a gob feeder and guided into the open ends of parison molds. The upper ends of the mold cavities are closed by baffles and the parisons are formed by pressing or blowing operations.

While the description of the invention is made in connection with so-called narrow neck machines, it should be pointed out that the gob chutes of the invention are equally applicable to the delivery of gobs to any type of forming machine, such as narrow neck or wide mouth. In loading a narrow neck machine having split blank molds, the sequence of operation is such that the mold halves are brought together to form a parison cavity. A gob of molten glass is delivered by gravity into the mold cavity by means of a gob chute funnel system. After the parison has been pressed or blown, it is thereafter transferred to a final mold and blown to final form.

When feeding pairs of gobs successively to plural machines, it is necessary to operate gob chutes at rapid and controlled rates so that they are properly positioned to receive the gobs when they are severed.

From the standpoint of economic operation of glass forming machines, it is necessary to feed several machines from a single feeder.

In order to feed a plurality of machines from a single feeder, it is necessary to direct severed gobs or mold charges from the point of severance beneath the feeder orifices to parison forming molds which are laterally displaced from a vertical plane passing through the charge forming orifices of the feeder. The speeds at which the forming machines may operate are dependent to a certain extent upon the speed with which the gob delivery system may be successfully operated and this invention is primarily concerned with the mechanism for directing successively severed gobs or mold charges to a plurality of machines spaced beneath the feeder.

It is, therefore, an object of this invention to provide a mechanism for directing gobs to plural forming machines.

It is a further object of this invention to provide plural gob chutes which are alternately actuated so as to receive mold charges alternately in succession.

It is a further object of this invention to provide a novel arrangement for the sequential positioning of pairs of gob chutes beneath a molten glass feeder.

In the form of the invention herein illustrated, plural cavitied blank molds are provided for simultaneously molding plural parisons or blanks. The mold charges or gobs are severed from the supply body and dropped into gob chutes positioned to receive them. The mold charges are carried by gravity through the chutes and guides individual to the blank molds and are thereby directed to deflectors which deflect them from an inclined to a vertical path and direct them into vertical tubes or funnel guides through which the gobs drop into the blank molds therebeneath.

Referring to the accompanying drawings which illustrate the preferred form of apparatus:

FIG. 1 is an elevational view, partly diagrammatic, with parts broken away and parts shown in section, showing two molding machine units of the narrow neck type for molding bottles, and the apparatus for delivering plural mold charges in alternation to the two machines;

FIG. 2 is an elevational view showing the gob chutes and guides and the piston motors for swinging the gob chutes;

FIG. 3 is a sectional view taken at line 3—3 of FIG. 2 and illustrating the pivotal mounting of the chutes;

FIG. 4 is a detailed elevational view showing the supports for the inclined guides.

Referring particularly to FIG. 1, the invention is shown as used with a plurality of press molding machine units 10 mounted on a base 11. An upper machine support structure 12 is supported above the base 11 by means of upright pedestals 13. Each molding unit comprises a horizontal turret 14 mounted for rotation about a vertical axis on a drive shaft 15 extending vertically downward from the upper support structure 12. The turret 14 is provided with a plurality of neck molds (not shown). The machine units 10 are of the narrow neck type for molding bottles "B." Each machine unit includes, in addition to the turret 14, a plural cavity blank mold 16 mounted on the support 12 in position to cooperate with turret 14. A pair of press plungers having a stationary mounting on the base 11 are vertically movable by piston rods 17 into and out of the blank mold. After the parisons are pressed to shape in molds 16, the latter are opened and turret 14 is advanced to the next station, the blowing station. During this advance, the parisons are held by the neck rings on the turret and rotated about an axis lying in the plane of the turret. Thus, the parisons are transferred horizontally, and, while so doing, are also changed in attitude from their inverted position as formed by mold 16 to an upright suspended position at the blowing station. A finishing mold 18 mounted on the base 11 at the blowing station is adapted to be closed about the parisons and the parisons are therein blown to finished form by air supplied through blow heads 19. The finished ware is carried by its neck from the blow mold 16 to a takeout station 20 where the finished ware is removed from the neck molds. The takeout station 20 has a pair of ware bottom engaging members 21 which are raised by means of pistons 22. When the members 21 engage the bottom of the ware, the neck molds are opened by the operation of a mechanism 23 positioned above the turret at the takeout station and the ware is released to the members 21. The details of the turrets, neck molds, mechanism for rotating the neck molds and parisons held thereby, and mechanism for opening the neck molds do not form any part of this invention and are fully disclosed in a copending application Serial No. 774,775, filed November 18, 1958, and assigned to the assignee of this application.

In the present invention, the mold charges, as gobs, are supplied to the forming units 10 from a conventional gob feeder 26 including shears 27 by which the pairs of gobs are periodically severed from the supply body of molten glass. The pairs of gobs after being severed fall into the gob chutes 28 which are individual to the molding machine units. The gobs are delivered to the particular unit 10 depending upon which pair of gob chutes 28 is moved into register with the gob feeder, as presently described.

Referring specifically to FIGS. 2 and 3, there is shown the details of the manner of mounting one pair of chutes with respect to the machine support element 12. It should be understood that the other pair of chutes disclosed in FIG. 1, will be substantially identical in construction and operation, but will constitute a mirror image of that shown in detail in FIGS. 2 and 3.

The gob chutes 28 are attached to a slide 29 which in turn is mounted in tapered slideways 30 and 31 formed in a head or rocker 32. A spring biased detent member 33 retains the slide 29 in place in the head 32 and permits quick and easy replacement of this unit. As best shown in FIG. 3, the detent 33 is biased in its holding direction by a spring 34, and for convenience, carries an operating handle 35 for retracting the same to release the slide 29. Each pair of gob chutes 28, when in register with the gob feeder, directs the gobs into a pair of stationary inclined trough shaped guides 36. The gobs pass from the guides 36 to deflectors 37 (FIG. 1) by which they are deflected from an inclined to a vertical path and are carried vertically downward through tubes 38 into blank mold cavities formed in blank molds 16 located below and in register therewith.

Each pair of gob chutes 28 is mounted to swing about the axis of a horizontal pivot pin 39 to which is secured the aforementioned head or rocker 32. The pin 39 is journaled in a bracket 40 which in turn is bolted to the top of the support element 12. The head or rocker 32 has two radially extending arms 41 and 42 which extend outwardly from the pin 39 at approximately right angles to each other. The arms 41 and 42 carry rollers 43 and 44 at their outer ends which are adapted to be respectively engaged by piston members 45 and 46. Piston member 45 is slidable in a horizontal cylinder 47 carried by the bracket 40. The bracket 40 also carries a cylinder 48 in which the piston 46 reciprocates and moves in engagement with the roller 44. Operating fluid is supplied to the cylinder 47 through a pipe 49 and passageway 50 for advancing the piston 45 toward the left, as viewed in FIG. 2.

Inasmuch as the rocker 32 and its arms 41 and 42 are an integral member, movement of the piston 45 against the roller 43 will pivot the rocker in a clockwise direction (viewed on FIGS. 1 and 2), roller 44 will engage the piston 46 and force it into the cylinder 48. At this time, the cylinder 48 will have its chamber connected to an exhaust port through a conduit 51. The rate at which fluid is expelled from the cylinder 48 may be controlled in any conventional manner so as to provide a rate control on the movement of the rocker 32. The above described motion will pivot the chutes 28 out of alignment with the feeder. As can readily be seen, connecting the conduit 51 to a supply of hydraulic fluid will result in a swinging of the chutes 28 in the opposite direction by a counter-clockwise actuation of rocker 32 until the chutes become aligned with the feeder orifices. Control of the rate of movement in a counter-clockwise direction may likewise be affected by controlling the exhaust of fluid from the cylinder 47 through the passageway 50 and pipe 49.

Additional dampening of the piston operation at the end of the stroke is accomplished by the utilization of a recessed chamber 58 formed within the end of the piston, cooperating with a stud 59 attached to the end of the cylinder and adapted to enter the recessed chamber when the piston is forced into retracting position.

The stationary guides 36 which receive the gobs from the chutes 28, are adjustably mounted so as to be in alignment with the chutes 28 when in the position shown in FIG. 2. The means for adjusting the guides 36 takes the form of a horizontal shaft 52 (FIG. 4) fixed to the bracket 40 and to which a pair of adjustable clamps 53 are attached. Clamps 53 each carry a supporting rod 54 which is axially adjustable in the clamps 53 and which carry arms 55 at their respective ends. The guides 36 each carry a hook 56 fastened to its undersurface which is adapted to engage the arms 55 and retain the guides 36 in a fixed adjustable position. The lower ends of the guides are adapted to rest on adjustable pins 57.

The valves which control the introduction of hydraulic fluid to the cylinders 47 and 48 are under the control of timer mechanism including a cam drum 60 (FIG. 1). The drum is mounted on frame 12 and driven by a vertical shaft 61 which is rotated in synchronism with the feeder shears 27 and controls the actuation of the various machine elements. The cam drum is common to all the molding machine units. The drum 60, as it rotates, carries cams 62 which operate cam follower rolls 63 on valve operating arms 64. The valve operating arm 64 will operate a valve in the hydraulic fluid supply lines to the cylinder 47 and 48 so as to alternately connect them to a pressure source and exhaust in the proper timed sequence.

In summary, it can be seen that this invention provides positive means for alternately moving plural gob chutes into position below a feeder and which means is capable of quick operation and easy maintenance. The two pistons are continuously in engagement with the rollers of the chute support, thus eliminating any lost motion or slack in the chute operating system. This allows positive control of the movements of the gob chutes, both as to speed and displacement. By having positive control of speed and displacement, it is possible to accurately time the actuation of the two drive pistons. Furthermore, by providing pivotally supported gob chutes whose movement is limited, the time required for retracting one set of gob chutes and inserting the other set of gob chutes is reduced to a minimum and allows for the feeding of plural gobs to plural machines at an increased rate.

I claim:

1. Apparatus for feeding mold charges or gobs of molten glass to a pair of forming machines from a single orifice feeder comprising, an upper machine support structure on each machine in abutting relationship, a bracket fixed to and extending above the upper support structure of each machine, a horizontal pivot pin extending through each bracket in parallel opposed relationship with respect to a vertical plane passing through the orifice of the feeder, a rocking head mounted on each pin for pivotal movement about the axis of said pin, a curved gob chute attached to each head with the point of attachment being adjacent the lower end of the chute and the continuous curvature of said chutes being downwardly and outwardly with respect to said plane in all positions of movement, a pair of radially extending arms formed integral with said head and extending at right angles to each other, a roller connected to the extending end of each said arms, motor means connected to each said bracket for contacting the rollers on said arms to alternately position said gob chutes into gob receiving position in relation to said feeder orifice, a timing drum common to both forming machines, a cam carried by said drum, and means responsive to the movement of said cam for actuating said motor means in predetermined sequence.

2. Apparatus for feeding pairs of mold charges of molten glass to a pair of forming machines from a double orifice feeder comprising, an upper machine support structure on each machine in abutting relationship, a bracket fixed to and extending above the upper support structure of each machine, a horizontal pivot pin extending through each bracket in parallel opposed relationship with respect to a vertical plane passing between the double orifice feeder, a rocking head mounted on each pin for pivotal movement about the axis of said pin, a pair of curved gob chutes attached to each head with the point of attachment being adjacent the lower end of the chutes and the continuous curvature of said chutes being downwardly and outwardly with respect to said plane in all positions of movement, a pair of radially extending arms formed integral with said head and extending at right angles to each other, a roller connected to the extending end of each said arms, motor means connected to each said bracket for contacting the rollers on said arms to alternately position said pairs of gob chutes into gob receiving position in relation to said feeder, a timing drum common to both forming machines, a cam carried by said drum, and means responsive to the movement of said cam for actuating said motor means in predetermined sequence.

References Cited in the file of this patent
UNITED STATES PATENTS

| | | |
|---|---|---|
| 1,350,448 | Graham et al. | Aug. 24, 1920 |
| 1,823,062 | Pleukharp et al. | Sept. 15, 1931 |
| 2,637,429 | Pond | May 5, 1953 |
| 2,669,805 | Rowe | Feb. 23, 1954 |
| 2,811,815 | Eldred | Nov. 5, 1957 |
| 2,836,934 | McLaughlin et al. | June 3, 1958 |
| 2,926,457 | Trudeau | Mar. 1, 1960 |